(12) United States Patent
Lee et al.

(10) Patent No.: US 11,563,396 B2
(45) Date of Patent: Jan. 24, 2023

(54) BATTERY HEATING SYSTEM AND METHOD USING MOTOR DRIVING SYSTEM

(71) Applicants: Hyundai Motor Company, Seoul (KR); Kia Motors Corporation, Seoul (KR)

(72) Inventors: Yong Jae Lee, Gyeonggi-do (KR); Jung Hwi Kim, Gyeonggi-do (KR); Jung Mo Yu, Seoul (KR); Jae Ho Hwang, Daejeon (KR); Joo Young Park, Gyeonggi-do (KR); Jae Hyeon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 16/951,081

(22) Filed: Nov. 18, 2020

(65) Prior Publication Data
US 2022/0014137 A1    Jan. 13, 2022

(30) Foreign Application Priority Data

Jul. 8, 2020 (KR) .................. 10-2020-0084031

(51) Int. Cl.
*H02P 1/00* (2006.01)
*H02P 27/06* (2006.01)
*H01M 10/637* (2014.01)
*H01M 10/625* (2014.01)
*H01M 10/615* (2014.01)

(52) U.S. Cl.
CPC .......... *H02P 27/06* (2013.01); *H01M 10/615* (2015.04); *H01M 10/625* (2015.04); *H01M 10/637* (2015.04); *H01M 2220/20* (2013.01)

(58) Field of Classification Search
CPC ...... H02P 27/06; H02P 29/68; H01M 10/615; H01M 10/625; H01M 10/637; H01M 2220/20
See application file for complete search history.

(56) References Cited

FOREIGN PATENT DOCUMENTS

| CN | 105579275 A | * | 5/2016 | ............ B60L 11/123 |
|---|---|---|---|---|
| CN | 113928183 A | * | 1/2022 | |
| JP | 2016-004649 A | | 1/2016 | |
| KR | 10-2011-0112132 A | | 10/2011 | |

* cited by examiner

*Primary Examiner* — Karen Masih
(74) *Attorney, Agent, or Firm* — Fox Rothschild LLP (57) ABSTRACT

A battery heating system and method using a motor driving system are provided. A temperature of a battery is increased by injecting an alternating current into the battery so that charging and discharging of the battery is repeated using the motor driving system including an inverter and a motor provided in a vehicle.

25 Claims, 8 Drawing Sheets

BATTERY HEATING SYSTEM AND METHOD USING MOTOR DRIVING SYSTEM

CROSS REFERENCE TO RELATED APPLICATION

The present application claims priority to Korean Patent Application No. 10-2020-0084031, filed Jul. 8, 2020, the entire contents of which is incorporated herein for all purposes by this reference.

BACKGROUND

1. Technical Field

The present disclosure relates to a battery heating system and method using a motor driving system, and more particularly, to a battery heating system and method using a motor driving system in which a temperature of a battery may be increased by injecting an alternating current into the battery so that charging and discharging of the battery may be repeated using the motor driving system including an inverter and a motor provided in a vehicle.

2. Description of the Related Art

In general, an eco-friendly vehicle driven using electrical energy may include a battery that stores the electrical energy, an inverter that converts the electrical energy stored in the battery into alternating current (AC) power having a plurality of phases, and a motor that generates kinetic energy by rotating using the AC power converted by the inverter.

Recently, the battery of the eco-friendly vehicle is mainly made of a lithium-ion battery. The lithium ion battery has excellent performance when considering excellent energy density and charge/discharge cycles at room temperature. However, the lithium ion battery has disadvantages of reduced capacity, increased resistance, and reduced efficiency at low temperatures due to the characteristics of electrolytes constituting the lithium ion battery. In particular, when the lithium ion battery is charged at a low temperature or overcharged, a phenomenon in which lithium ions are unevenly deposited on a surface of an anode to reduce the lifespan of the lithium ion battery occurs. Due to such a problem, the lithium ion battery requires a heating apparatus capable of rapidly increasing a temperature from a low temperature state to a high temperature state with high efficiency.

Conventionally, a method of directly heating the battery or heating coolant supplied to the battery to circulate the heated coolant by adding a heater (e.g., a positive temperature coefficient (PTC) heater) to the battery was applied. However, in such a conventional battery heating method, a separate heater is required, which causes additional cost increase and volume increase.

As another conventional battery heating technique, a method of generating heat inside the battery by an electric method has been studied. Such a method uses internal resistance of the battery, and is a method of allowing the current to flow through the battery and using losses generated in proportion to the amount of flowing current as heat. Such a method has an advantage of uniformly increasing heat in the battery due to the current that is evenly conducted through the battery. However, a separate dedicated circuit is required to allow the current to flow through the battery, which also results in additional volume and cost, and a problem that complicates maintenance of the vehicle occurs since additional management points for the dedicated circuit that generates and flows current for heating the battery occur.

The contents described as the related art have been provided only to assist in understanding the background of the present disclosure and should not be considered as corresponding to the related art known to those having ordinary skill in the art.

SUMMARY

An object of the present disclosure is to provide a battery heating system and method using a motor driving system in which a temperature of a battery may be increased by injecting an alternating current (AC) into the battery so that charging and discharging of the battery may be repeated using the motor driving system including an inverter and a motor provided in a vehicle without a separate heating apparatus for increasing the temperature of the battery.

According to an exemplary embodiment of the present disclosure, a battery heating system using a motor driving system may include: an inverter having a plurality of legs that each include a pair of switching elements connected in series to each other between both ends of a battery and correspond to each of a plurality of phases; a motor having a plurality of coils each having a first end connected to a connection terminal between the pair of switching elements included in the plurality of legs, second ends of each of the plurality of coils being connected to each other; and a controller configured to operate the switching elements so that a first section in which at least some of the switching elements are turned on and a second section in which all of the switching elements are turned off are alternately repeated.

The controller may be configured to operate or drive the switching elements in a first switch driving mode in which the controller drives the switching elements so that on/off states of the switching elements included one leg corresponding to one reference phase of the plurality of phases and the switching elements included in the remaining legs are in a mutually complementary relationship, or in a second switch driving mode in which the controller drives the switching elements so that the on/off states of the switching elements included in the legs corresponding to two phases of the plurality of phases are in the mutually complementary relationship and drives the switching elements included in the remaining leg to be in the off state, in the first section.

The controller may be configured to perform control so that the on/off states of the pair of switching elements included in the plurality of legs are in the mutually complementary relationship in the first section when using a first driving technique, and perform control so that on/off states of a switching element connected to a positive terminal of the battery among the switching elements included in the leg corresponding to the reference phase and a switching element connected to the positive terminal of the battery among the switching elements included in the remaining legs are in the mutually complementary relationship.

Additionally, the controller may be configured to perform control so that states of a pair of switching elements included in a first leg corresponding to one phase of two selected phases are in the mutually complementary relationship according to a switching frequency and perform control so that states of a pair of switching elements included in a second leg corresponding to the other phase of the two selected phases are in the mutually complementary relationship according to the switching frequency, in the first section, when applying a second driving technique, and may perform control so that states of a switching element connected to a positive terminal of the battery among the switching elements in the first leg and a switching element connected to the positive terminal of the battery among the switching elements in the second leg are in the mutually complementary relationship.

The controller may further be configured to determine the reference phase applied in the first switch driving mode or the two phases in which the switching elements are driven in the second switch driving mode, based on an angle of a rotor of the motor. The controller may also be configured to determine the reference phase of the first switch driving mode or the two phases in which the switching elements are driven in the second switch driving mode to minimize a difference between the angle of the rotor and an angle indicated by a current provided to the motor on a dq stationary coordinate plane.

According to another exemplary embodiment of the present disclosure, a battery heating system using a motor driving system may include: an inverter having an a-phase leg, a b-phase leg, and a c-phase leg each including a pair of switching elements connected in series between both ends of a battery; a motor including an a-phase coil having a first end connected to a connection node between the pair of switching elements included in the a-phase leg, a b-phase coil having a first end connected to a connection node between the pair of switching elements included in the b-phase leg, and a c-phase coil having a first end connected to a connection node between the pair of switching elements included in the c-phase leg, a second end of the a-phase coil, a second end of the b-phase coil, and a second end of the c-phase coil being connected to each other; and a controller configured to drive or operate the switching elements so that a first section in which at least some of the switching elements are turned on and a second section in which all of the switching elements are turned off are alternately repeated.

Additionally, the controller may be configured to drive the switching elements in a first switch driving mode in which the controller drives the switching elements so that on/off states of the switching elements included a leg corresponding to one reference phase of an a-phase, a b-phase, and a c-phase and on/off states of the switching elements included in the legs corresponding to the remaining phases are in a mutually complementary relationship, or in a second switch driving mode in which the controller drives the switching elements so that the on/off states of the switching elements included in the legs corresponding to two phases of the a-phase, the b-phase, and the c-phase are in the mutually complementary relationship and drives the switching elements included in the remaining leg to be in the off state, in the first section.

The controller may further be configured to perform control so that the on/off states of the pair of switching elements included in the plurality of legs are in the mutually complementary relationship in the first section when using a first driving technique, and perform control so that on/off states of a switching element connected to a positive terminal of the battery among the switching elements included in the leg corresponding to the reference phase and a switching element connected to the positive terminal of the battery among the switching elements included in the remaining legs are in the mutually complementary relationship.

The controller may also be configured to perform control so that states of a pair of switching elements included in a first leg corresponding to one phase of two selected phases are in the mutually complementary relationship according to a switching frequency and perform control so that states of a pair of switching elements included in a second leg corresponding to the other phase of the two selected phases are in the mutually complementary relationship according to the switching frequency, in the first section, when applying a second driving technique, and may perform control so that states of a switching element connected to a positive terminal of the battery among the switching elements in the first leg and a switching element connected to the positive terminal of the battery among the switching elements in the second leg are in the mutually complementary relationship.

The controller may be configured to determine the reference phase applied in the first switch driving mode or the two phases in which the switching elements are driven in the second switch driving mode, based on an angle of a rotor of the motor. The controller may be configured to determine the reference phase of the first switch driving mode or the two phases in which the switching elements are driven in the second switch driving mode to minimize a difference between the angle of the rotor and an angle indicated by a current provided to the motor on a dq stationary coordinate plane.

The controller may be configured to drive the switching elements in the first switch driving mode when the remainder of dividing a value obtained by adding 15° to the angle of the rotor by 30° is an even number, and drive the switching elements in the second switch driving mode when the remainder of dividing a value obtained by adding 15° to the angle of the rotor by 30° is an odd number. The controller may be configured to drive the switching elements by determining the a-phase as a reference phase when the angle of the rotor is 0° to 30°, 150° to 210°, and 330° to 360°, in the first switch driving mode. The controller may also be configured to drive the switching elements by determining the c-phase as a reference phase when the angle of the rotor is 30° to 90° and 210° to 270°, in the first switch driving mode. The controller may be configured to drive the switching elements by determining the b-phase as a reference phase when the angle of the rotor is 90° to 150° and 270° to 330°, in the first switch driving mode.

In the second switch driving mode, the controller may be configured to select the c-phase leg and the a-phase leg when the angle of the rotor is 0° to 60° and 180° to 240°, drive the on-off states of the switching elements included in the c-phase leg and the a-phase leg in the mutually complementary relationship in the first section, and turn off the switching elements included in the b-phase leg. In the second switch driving mode, the controller may be configured to select the b-phase leg and the c-phase leg when the angle of the rotor is 60° to 120° and 240° to 300°, drive the on-off states of the switching elements included in the b-phase leg and the c-phase leg in the mutually complementary relationship in the first section, and turn off the switching elements included in the a-phase leg. In the second switch driving mode, the controller may be configured to select the a-phase leg and the b-phase leg when the angle of the rotor is 120° to 180° and 300° to 360°, drive the on-off states of the switching elements included in the a-phase leg and the b-phase leg in the mutually complementary relationship in the first section, and turn off the switching elements included in the c-phase leg.

According to still another exemplary embodiment of the present disclosure, a battery heating method using the battery heating system described above may include: determining, by the controller, a section to which an angle of a rotor of the motor belongs; selecting, by the controller, one of the first switch driving mode and the second switch driving mode based on the section to which the angle of the rotor belongs; driving, by the controller, the switching elements so that on/off states of the switching elements included in a leg corresponding to the reference phase and on/off states of the switching elements included in the legs corresponding to the remaining phases are in the mutually complementary relationship in the first section, when the first switch driving mode is selected; and driving, by the controller, the switching elements so that on/off states of the switching elements included in the legs corresponding to two phases are in the mutually complementary relationship in the first section and driving, by the controller, the switching elements so that the switching elements included in the remaining leg are in the off state, when the second switch driving mode is selected.

In the selecting of one of the first switch driving mode and the second switch driving mode, the controller may be configured to drive the switching elements in the first switch driving mode when the remainder of dividing a value obtained by adding 15° to the angle of the rotor by 30° is an even number, and drive the switching elements in the second switch driving mode when the remainder of dividing a value obtained by adding 15° to the angle of the rotor by 30° is an odd number. In the driving of the switching elements, when the first switch driving mode is selected, the controller may be configured to drive the switching elements by determining the a-phase as a reference phase when the angle of the rotor is 0° to 30°, 150° to 210°, and 330° to 360°.

In the driving of the switching elements, when the first switch driving mode is selected, the controller may be configured to drive the switching elements by determining the c-phase as a reference phase when the angle of the rotor is 30° to 90° and 210° to 270°. In the driving of the switching elements, when the first switch driving mode is selected, the controller may be configured to drive the switching elements by determining the b-phase as a reference phase when the angle of the rotor is 90° to 150° and 270° to 330°. In the driving of the switching elements, when the second switch driving mode is selected, the controller may be configured to select the c-phase leg and the a-phase leg when the angle of the rotor is 0° to 60° and 180° to 240°, drive the on-off states of the switching elements included in the c-phase leg and the a-phase leg in the mutually complementary relationship in the first section, and turn off the switching elements included in the b-phase leg.

In the driving of the switching elements, when the second switch driving mode is selected, the controller may be configured to select the b-phase leg and the c-phase leg when the angle of the rotor is 60° to 120° and 240° to 300°, drive the on-off states of the switching elements included in the b-phase leg and the c-phase leg in the mutually complementary relationship in the first section, and turn off the switching elements included in the a-phase leg. In the driving of the switching elements, when the second switch driving mode is selected, the controller may be configured to select the a-phase leg and the b-phase leg when the angle of the rotor is 120° to 180° and 300° to 360°, drive the on-off states of the switching elements included in the a-phase leg and the b-phase leg in the mutually complementary relationship in the first section, and turn off the switching elements included in the c-phase leg.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery heating system and method a motor driving system according to various exemplary embodiments will be described in more detail with reference to the accompanying drawings.

Figure 1:
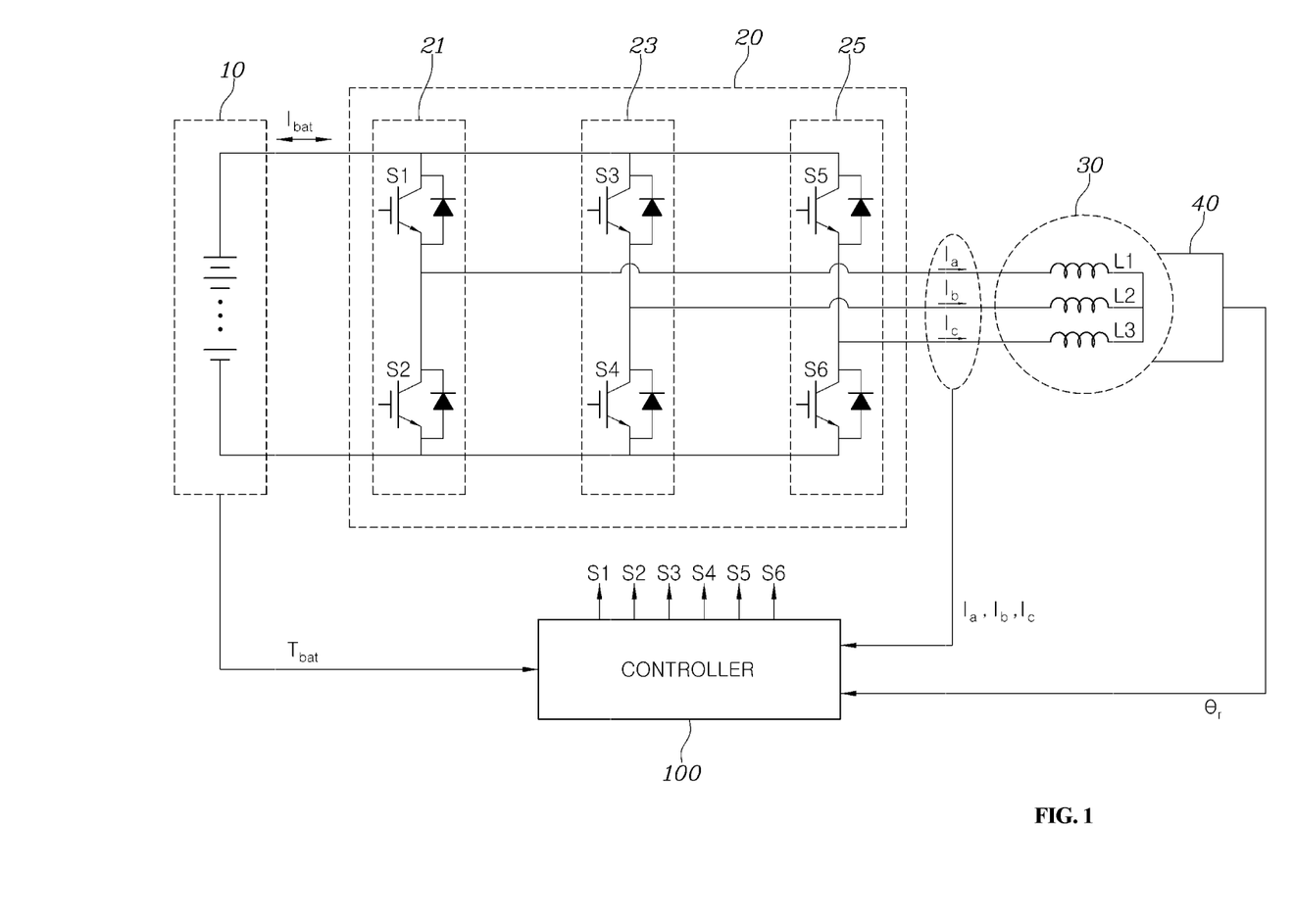
FIG. 1 is a circuit diagram of a battery heating system using a motor driving system according to an exemplary embodiment of the present disclosure.

FIG. 1 is a circuit diagram of a battery heating system using a motor driving system according to an exemplary embodiment of the present disclosure. As illustrated in FIG. 1, a typical system for driving a motor 30 may include a battery 10, which is an energy storage device configured to store power for driving the motor 30, and an inverter 20 configured to convert direct current (DC) power stored in the battery 10 into alternating current (AC) having a plurality of phases and provides the AC to the motor 30. The inverter 20 has three legs 21, 23, and 25 connected to each other in a parallel relationship to both ends of the battery 10, two switching elements (two of S1 to S6) are connected to each of the leg 21, 23, and 25 in series with each other, and a driving power of one phase is provided to the motor 30 from a connection node of the two switching elements. To drive such a motor, a pulse width modulation control of the switching elements S1 to S6 in the inverter 20 may be performed to provide a current to the motor 30 as much as a current command corresponding to a torque of the motor 30 to be obtained through the driving of the motor 30.

The battery heating system using the motor driving system according to an exemplary embodiment of the present disclosure controls states of the switching elements S1 to S6 in the inverter 20 so that the alternating current (pulsating current) may be injected into the battery 10, while suppressing torque generated in the motor 30 using such a typical motor driving system. Specifically, the battery heating system using the motor driving system according to an exemplary embodiment of the present disclosure may the battery 10, the inverter 20 having a plurality of legs 21, 23, and 25 each including a pair of switching elements S1 to S6 connected to each other in series to both ends of the battery 10, the motor 30 having a plurality of coils L1, L2, and L3 that are respectively connected to connection terminals of the switching elements included in the legs 21, 23, and 25 in the inverter 20, and a controller 100 configured to generate an alternating current injected into the battery 10 by determining on/off states of the switching elements S1 to S6 included in the plurality of legs in the inverter 20.

According to an exemplary embodiment of the present disclosure, the controller 100 may be configured to drive the switching elements so that a first section for turning on some of the switching elements S1 to S6 and a second section for turning off all of the switching elements S1 to S6 in the inverter 20 are alternately repeated. During the second section in which all of the switching elements S1 to S6 are turned off, all currents provided to the motor 30 may be zero, and in this state, by switching to the first section again and starting switching of the switching elements, zero current switching may be performed such that switching of the switching elements S1 to S6 is performed in a state in which a motor current is zero.

When applying such zero current switching, it may be possible to reduce a switching loss of the switching elements, thereby improving overall system efficiency. In particular, the controller 100 may be configured to drive the switching elements S1 to S6 in a first switch driving mode and a second switch driving mode according to the number of phases to which the switching element to be switched in the first section belongs.

In the first switch driving mode, the controller 100 may be configured to drive the switching elements S1 to S6 so that a switching element belonging to a leg corresponding to one reference phase that is a reference among a plurality of phases and switching elements belonging to the legs corresponding to the remaining phases are in a mutually complementary state in the first section. In the second switch driving mode, the controller 100 may be configured to drive the switching elements S1 to S6 so that switching elements belonging to legs corresponding to two phases of the plurality of phases are in the mutually complementary state and all switching elements of other phases are in a turned-off state.

Figure 2:
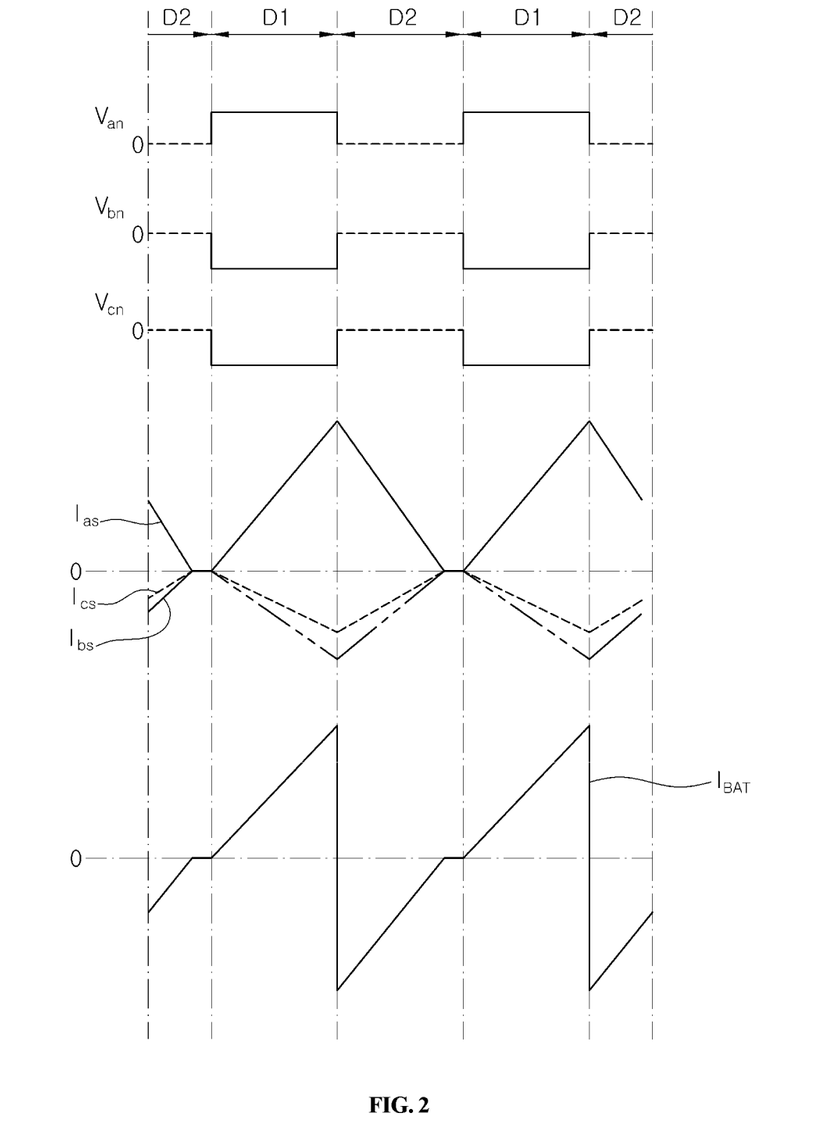
FIG. 2 is a waveform diagram illustrating a technique for generating a battery current when a first switch driving mode is applied in a motor driving system and method according to an exemplary embodiment of the present disclosure.
Figure 3:
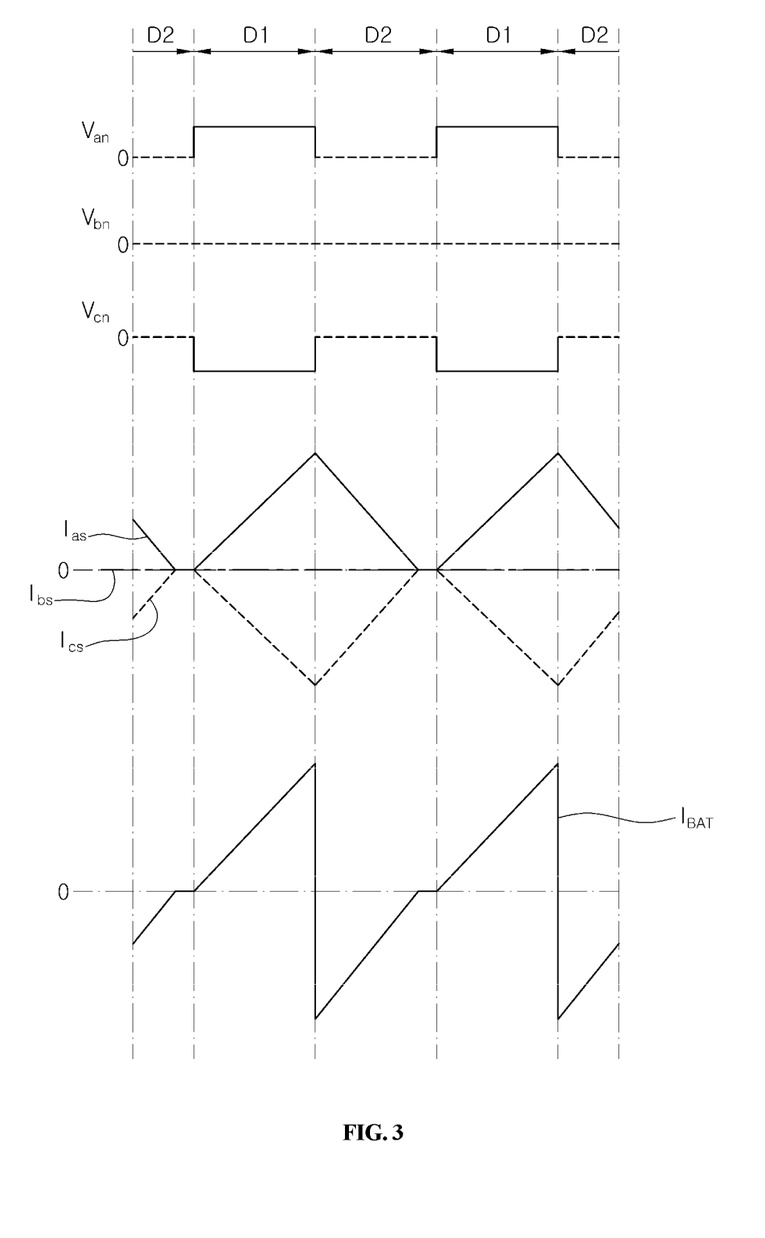
FIG. 3 is a waveform diagram illustrating a technique for generating a battery current when a second switch driving mode is applied in the motor driving system and method according to an exemplary embodiment of the present disclosure.

FIG. 2 is a waveform diagram illustrating a technique for generating a battery current when a first switch driving mode is applied in a motor driving system and method according to an exemplary embodiment of the present disclosure and FIG. 3 is a waveform diagram illustrating a technique for generating a battery current when a second switch driving mode is applied in the motor driving system and method according to an exemplary embodiment of the present disclosure.

As illustrated in FIGS. 2 and 3, the controller 100 may be configured to drive the switching elements S1 to S6 to alternately repeat a first section D1 and a second section D2 d. In the first section D1, pole voltages $V_{an}$, $V_{bn}$, and $V_{cn}$ appear on at least two phases of the respective phases of the motor by the on/off driving of the switching elements S1 to S6. In contrast, in the second section D2, by turning off all the switching elements S1 to S6, the pole voltages $V_{an}$, $V_{bn}$, and $V_{cn}$ are not applied to the entire phase of the motor.

More specifically, referring to FIG. 2, in the first section D1 of the first driving mode, the controller 100 may be configured to complementarily operate a pair of switching elements included in each of the legs 21, 23, and 25 in the inverter 20, and complementarily operate the switching element S1 connected to a positive (+) terminal of the battery among the switching elements S1 and S2 included in the first leg 21 of the plurality of legs 21, 23, and 25, and the switching elements S3 and S5 connected to the positive (+) terminals of the battery 10 among the switching elements included in the remaining two legs 23 and 25. Through such control, polarities of a-phase current $I_{as}$ flowing through the coil L1 corresponding to an a-phase among a plurality of phases included in the motor 30 and phase currents $I_{bs}$ and $I_{cs}$ flowing through the coils L2 and L3 corresponding to a b-phase and a c-phase are mutually opposite.

Subsequently, in the second section D2, when the controller 100 turns off all the switching elements S1 to S6 in the inverter 20, the current flowing through the motor 30 is gradually reduced by electrical characteristics of the coils L1, L2, and L3 of the motor, and a current in a direction opposite to the direction of the current flowing in the first section D1 is generated in the battery 10 due to reverse diodes connected to both ends of the switch elements S1 to S6. In the second section D2, a current $I_{BAT}$ generated in the battery 10 is reduced in size as a phase current of the motor 30 decreases, and when the phase current becomes zero, the battery current also becomes 0. Accordingly, through the control of the switching elements S1 to S6 of the first section D1 and the second section D2, the phase currents $I_{as}$, $I_{bs}$, and $I_{cs}$ that repeat the increase and decrease of each phase of the motor may be generated, and accordingly, a pulsating current may be applied to the battery 10.

In FIG. 2, an example in which the a-phase of the motor is determined as the reference phase has been described, but those skilled in the art may easily perform the same control by determining the b-phase or c-phase of the motor as the reference phase. To increase the temperature of the battery 10, important points to be considered when using heat generated from the internal resistance of the battery 10 are the amount of heat generated and the efficiency.

First, the amount of heat generated is proportional to the amount of current flowing through the battery 10. In other words, when a large amount of current flows in the internal resistance of the battery 10 regardless of the direction, a lot of heat is generated. Accordingly, by increasing a charge amount or discharge amount through charging that supplies DC current to the battery 10 or discharge that causes the DC current to be output from the battery 10, a heat generation amount of the battery 10 may be increased.

Next, to improve the efficiency, the controller may be configured to alternately perform the charging and the discharging of the battery 10 rather than performing only one of the charging or the discharging of the battery 10. Accordingly, when the charging and discharging of the battery 10 is performed alternately, an energy consumed in the battery 10 is minimal, but the amount of current flowing through the battery 10 may be increased. As a result, it may be possible to improve energy efficiency and to significantly increase the heat generation amount. In other words, when the AC is injected into the battery 10 instead of the DC, it may be possible to induce heat generation of the battery 10 with high energy efficiency by repeatedly outputting the current from the battery 10 and inputting the current to the battery 10.

At this time, if a frequency of the AC is sufficiently high, it may be possible to generate the heat in the battery 10 while preventing lithium precipitation inside the battery 10 and aging of the battery according to the lithium precipitation. In various exemplary embodiments of the present disclosure, it may be possible to operate the switching elements S1 to S6 in the inverter 20 to inject the alternating current having the high frequency into the battery.

To inject the alternating current into the battery 10, an operation of receiving and storing energy from the battery 10 and providing the stored energy to the battery 10 again is required. Particularly, for the required energy storage, in various exemplary embodiments of the present disclosure, the coils L1 to L3 corresponding to the plurality of phases provided in the motor 30 may be used. In other words, it may be possible to inject the alternating current into the battery 10 by storing and releasing the energy to and from the coils L1 to L3.

Referring to FIG. 3, in the first section D1 of the second driving mode, the controller 100 may be configured to turn on/off the switching elements included in two of the three legs included in the inverter 20 and turn off the switching elements included in the other leg in the first section D1. FIG. 3 illustrates an example in which on/off states of the switching elements S1, S2, S5, and S6 included in the legs 21 and 25 connected to the a-phase coil L1 and the c-phase coil L3 of the motor 30 are operated, and the switching elements S3 and S4 of the leg 23 connected to the b-phase coil L2 are turned off.

In the first section D1, the controller 100 may be configured to operate the switching elements S1, S2, S5, and S6 so that the pole voltage $V_{an}$ provided to the a-phase coil L1 of the motor 30 has a positive value and the c-phase pole voltage $V_{cn}$ provided to the c-phase coil L3 has a negative value. In other words, the controller 100 may be configured to turn on the switching element S1 of the leg 21 and turn off the switching element S2 thereof, and turn off the switching element S5 of the leg 25 and turn on the switching element S6 thereof. In the second switch driving mode, the controller 100 may be configured to turn off all of the switching elements S3 and S4 of the leg 23 connected to the b-phase coil L2.

Through such control, in the first section D1, the phase current $I_{as}$ flowing through the a-phase coil L1 of the motor 30 increases and the phase current $I_{cs}$ flowing through the c-phase coil L3 decreases by the a-phase coil L1 of the motor 30 being connected to the positive (+) terminal side of the battery 10. In particular, a direction in which each of the phase currents $I_{as}$ and $I_{cs}$ flows from the inverter 20 to the motor 30 may be set to a positive (+) direction. Due to the electrical characteristics of the coil (inductor) that stores the energy, even though an electric path is formed through switching of the switching element, the currents $I_{as}$ and $I_{cs}$ flowing through each coil may gradually increase or decrease. Therefore, even if the state of the switching element is changed, the direction of the current is changed after maintaining the direction of the current flowing in a previous section for a predetermined time as it is. In particular, the coils L1, L2, and L3 corresponding to each phase of the motor 30 may have a first end connected to the nodes where the pair of switching elements included in each leg 21, 23, and 25 of the inverter 20 are connected to each other, and second ends commonly connected between the coils L1, L2, and L3 to form a neural point.

In the second section D2, the controller 100 may be configured to turn off all of the switching elements S1 to S6 of the inverter 20. As described above, due to the electrical characteristics of the a-phase coil L1 and the c-phase coil L3 of the motor 30, each phase current gradually approaches a value of zero. At this time, a negative current, that is, a charging current input to the battery 10 flows through the battery 10 as the a-phase current and the c-phase current flow by the diodes provided in the switching elements.

Accordingly, through the control of the switching elements S1 to S6 of the first section D1 and the second section D2, the phase currents $I_{as}$, $I_{bs}$, and $I_{cs}$ that repeat the increase and decrease of each phase of the motor may be generated, and accordingly, a pulsating current may be applied to the battery 10. Meanwhile, to heat the battery 10 by injecting the high-frequency alternating current into the battery 10 using the inverter 20 and the motor 30, it is necessary to suppress an occurrence of torque in the motor 30 in addition to securing the battery current as described above.

Figure 4:
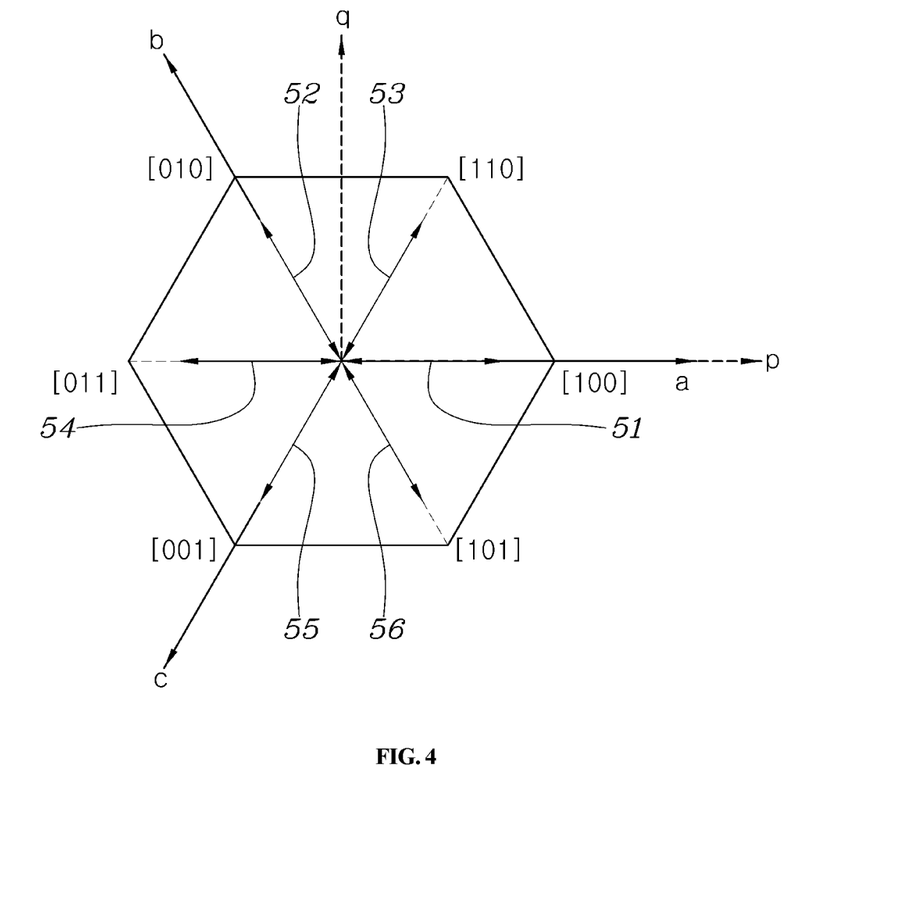
FIG. 4 is a vector diagram illustrating a technique for minimizing torque ripple when the first switch driving mode is applied in the motor driving system and method according to an exemplary embodiment of the present disclosure.
Figure 5:
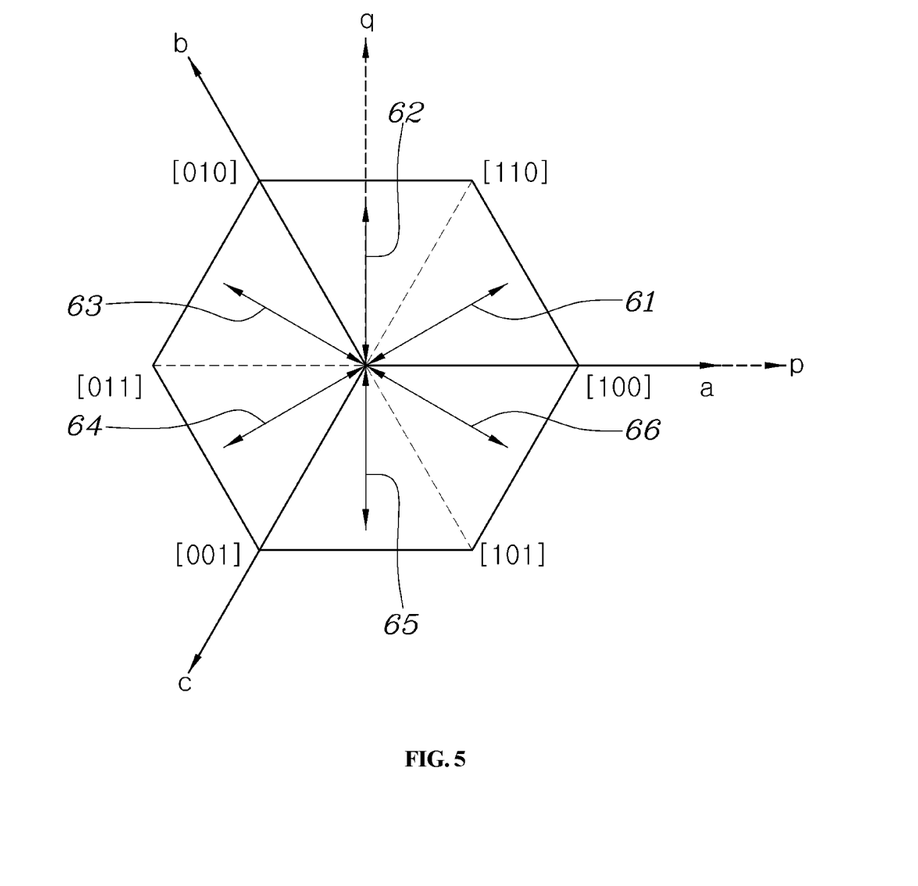
FIG. 5 is a vector diagram illustrating a technique for minimizing torque ripple when the second switch driving mode is applied in the motor driving system and method according to an exemplary embodiment of the present disclosure.

FIG. 4 is a vector diagram illustrating a technique for minimizing torque ripple when the first switch driving mode is applied in the motor driving system and method according to an exemplary embodiment of the present disclosure and FIG. 5 is a vector diagram illustrating a technique for minimizing torque ripple when the second switch driving mode is applied in the motor driving system and method according to an exemplary embodiment of the present disclosure.

First, a torque suppression technique in the first switch driving mode will be described with reference to FIG. 4. In a method of generating a current by complementarily determining the phase voltages of the coil corresponding to one phase of the motor and the coils corresponding to the other two phases thereof, the current may be generated as arrows indicated by reference numerals '51' to '56' illustrated in FIG. 4.

When the a-phase voltage and the remaining b-phase and c-phase voltages are complementarily controlled, motor currents 51 and 54 formed between the center of a hexagon and a vertex corresponding to a [100] vector and between the center of the hexagon and a vertex corresponding to a [011] vector may be formed. In addition, when the b-phase voltage and the remaining a-phase and c-phase voltages are complementarily controlled, motor currents 53 and 56 formed between the center of the hexagon and a vertex corresponding to a [010] vector and between the center of the hexagon and a vertex corresponding to a [101] vector may be formed. When the c-phase voltage and the remaining a-phase and b-phase voltages are complementarily controlled, motor currents 52 and 55 formed between the center of the hexagon and a vertex corresponding to a [110] vector and between the center of the hexagon and a vertex corresponding to a [001] vector may be formed. Particularly, the arrows indicated by reference numerals '51' and '54' correspond to 0° and 180°, respectively, based on an a-axis, the arrows indicated by reference numerals '53' and '56' correspond to 120° and 300°, respectively, based on the a-axis, and the arrows indicated by reference numerals '52' and '55' correspond to 60° and 240°, respectively, based on the a-axis.

Meanwhile, the torque generated in the motor according to the motor current may be expressed as Equation 1 below in the case of a permanent magnet synchronous motor having a saliency.

$$T_e = \frac{3}{2}\frac{P}{2}[\lambda_f + (L_d - L_q)i_d]i_q \qquad \text{Equation 1}$$

In Equation 1, $T_e$ is the torque of the motor, $\lambda_f$ is an electromotive force of the motor, $L_d$ and $L_q$ are d-axis and q-axis inductances of the motor, and $i_d$ and $i_q$ are d-axis and q-axis currents supplied to the motor.

As illustrated in Equation 1, the torque generated in the motor is not generated when the q-axis current is 0 ($i_q=0$). In other words, when the alternating current generated in the motor does not face the q-axis of a synchronous coordinate system, and exists only in the d-axis, the torque is not generated in the motor. Therefore, when the d-axis corresponding to an axis connecting an n-pole and an s-pole of a rotor of the motor 30 coincides with the arrows as illustrated in FIG. 4, that is, when angles of the rotor correspond to 0°, 60°, 120°, 180°, 240°, and 300°, which are angles of the arrows as illustrated in FIG. 4, the torque of the motor 30 may be 0.

A position of the rotor of the motor 30 may be determined arbitrarily, and therefore, in the exemplary embodiment of the present disclosure, by selecting a phase in which a difference between the angle of the rotor detected by a rotor position sensor 40 and the angles (e.g., the angles formed by the arrows 51 to 56 in FIG. 4 based on the a-axis) corresponding to the alternating currents generated by the on/off control of the switching elements of the inverter 20 may be minimized to control the switching elements to be turned on/off so that the voltages of the selected phase and the other two phases are in a mutually complementary relationship, the occurrence of the torque may be minimized.

Referring to FIG. 4, when the angle of the rotor is 0° to 30°, 150° to 210° and 330° to 360°, it is preferable to perform control based on the a-phase corresponding to the arrows 51 and 54. In other words, it is preferable to control the on-off state of the switching elements in the first section so that the a-phase voltage and the remaining b-phase and c-phase voltages are in the mutually complementary relationship. In addition, when the angle of the rotor is 30° to 90° and 210° to 270°, it is preferable to perform the control based on the c-phase corresponding to the arrows 52 and 55. In other words, it is preferable to control the on-off state of the switching elements in the first section so that the c-phase voltage and the remaining a-phase and b-phase voltages are in the mutually complementary relationship.

In addition, when the angle of the rotor is 90° to 150° and 270° to 330°, it is preferable to perform the control based on the b-phase corresponding to the arrows 53 and 56. In other words, it is preferable to control the on-off state of the switching elements in the first section so that the b-phase voltage and the remaining a-phase and c-phase voltages are in the mutually complementary relationship.

A torque suppression technique in the second switch driving mode will be described with reference to FIG. 5. The torque suppression technique of the second switch driving mode is similar in principle to the torque suppression technique of the first switch driving mode, but has a difference in the angle at which the motor current is formed. In the first section of the second switch driving mode in which the current is applied to the coils corresponding to the other two phases without applying the current to the coil corresponding to one phase, the current may be generated as arrows indicated by reference numerals '61' to '63' illustrated in FIG. 5.

In other words, when all the switching elements of the legs 23 corresponding to the b-phase are turned off so that the coil L2 corresponding to the b-phase is not used, and the coils L1 and L3 of the motor 30 corresponding to the a-phase and c-phase are used, the current may be generated as indicated by reference numerals '61' or '64' whose b-axis value corresponds to 0 (perpendicular to the b-axis). Similarly, when all the switching elements of the legs 21 corresponding to the a-phase are turned off so that the coil L1 corresponding to the a-phase is not used, and the coils L2 and L3 of the motor 30 corresponding to the b-phase and c-phase are used, the current may be generated as indicated by reference numerals '62' or '65' whose a-axis value corresponds to 0 (perpendicular to the a-axis).

Likewise, when all the switching elements of the legs 25 corresponding to the c-phase are turned off so that the coil L3 corresponding to the c-phase is not used, and the coils L1 and L2 of the motor 30 corresponding to the a-phase and b-phase are used, the current may be generated as indicated by reference numerals '63' or '66' whose c-axis value corresponds to 0 (perpendicular to the c-axis). Particularly, the arrows indicated by reference numerals '61' and '64' correspond to 30° and 210°, respectively, based on the a-axis, the arrows indicated by reference numerals '62' and '65' correspond to 90° and 270°, respectively, based on the a-axis, and the arrows indicated by reference numerals '63' and '66' correspond to 150° and 330°, respectively, based on the a-axis.

As described above, the torque generated in the motor is not generated when the q-axis current is 0 ($i_q=0$). In other words, when the alternating current generated in the motor does not face the q-axis of the synchronous coordinate system, and exists only in the d-axis, the torque is not generated in the motor. Therefore, when the d-axis corresponding to the axis connecting the n-pole and the s-pole of the rotor of the motor 30 coincides with the arrows as illustrated in FIG. 5, that is, when angles of the rotor correspond to 30°, 90°, 150°, 210°, 270°, and 330°, which are angles of the arrows as illustrated in FIG. 5, the torque of the motor 30 may be 0.

The position of the rotor of the motor 30 may be determined arbitrarily, and therefore, in the exemplary embodiment of the present disclosure, by selecting two phases in which a difference between the angle of the rotor detected by the rotor position sensor 40 included in the motor 30 and the angles (e.g., the angles formed by the arrows 51 to 56 in FIG. 5 based on the a-axis) corresponding to the alternating currents generated by the on/off control of the switching elements in the legs corresponding to the two phases is minimized to control the switching elements of the legs corresponding to the two phases, the occurrence of the torque may be minimized.

Referring to FIG. 5, when the angle of the rotor is 0° to 60° and 180° to 240°, it is desirable to generate the alternating current by selecting the c-phase leg and the a-phase leg corresponding to the arrows 61 and 64, controlling the on/off state of the switching elements included in the c-phase leg and the a-phase leg, and turning off the switching elements included in the b-phase leg. In addition, when the angle of the rotor is 60° to 120° and 240° to 300°, it is desirable to generate the alternating current by selecting the b-phase leg and the c-phase leg corresponding to the arrows 62 and 64, controlling the on/off states of the switching elements included in the b-phase leg and the c-phase leg, and turning off the switching elements included in the a-phase leg. In addition, when the angle of the rotor is 180° to 120° and 300° to 360°, it is desirable to generate the alternating current by selecting the a-phase leg and the b-phase leg corresponding to the arrows 63 and 66, controlling the on/off state of the switching elements included in the a-phase leg and the b-phase leg, and turning off the switching elements included in the c-phase leg.

Figure 6:
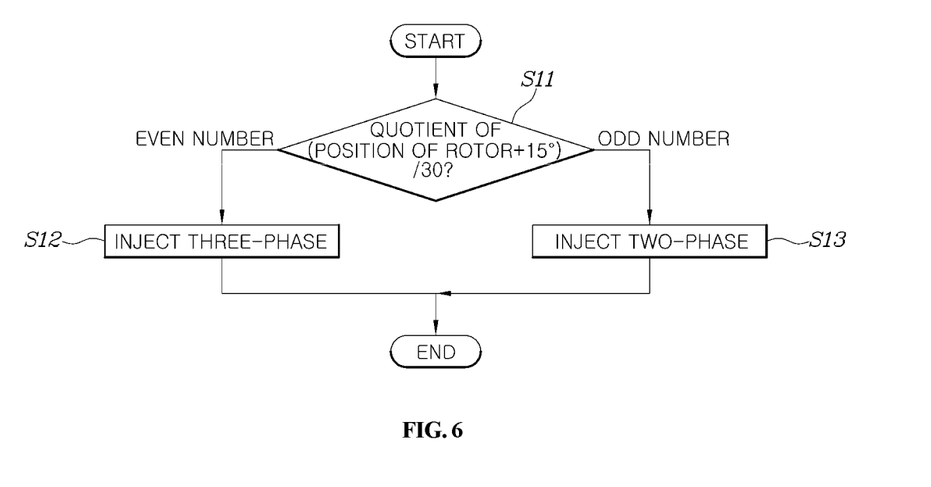
FIG. 6 is a flowchart illustrating a battery heating method using a motor driving system according to an exemplary embodiment of the present disclosure.

The present disclosure also provides a battery heating method implemented by the battery heating system using the motor driving system as described above. FIG. 6 is a flowchart illustrating a battery heating method using a motor driving system according to an exemplary embodiment of the present disclosure. The method described herein below may be executed by the controller described above. Referring to FIG. 6, the motor driving system according to an exemplary embodiment of the present disclosure may first receive the rotor position of the motor 30 and check the quotient and remainder of a value obtained by dividing the position of the rotor (e.g., the angle of the rotor) of the motor by 30° (S11) to select the first switch driving mode (S12) and the second switch driving mode (S13) and then perform heating control corresponding to each switch driving mode.

As illustrated in the arrows of FIGS. 4 and 5 described above, the motor current capable of suppressing the occurrence of the torque of the motor 30 during heating control may be determined in advance. If the arrows illustrated in FIGS. 4 and 5 are combined, the arrows of each mode alternately appear at intervals of 30° on a dq stop coordinate plane. In the arrows 51 to 56 illustrated in FIG. 4, the arrows appear every 60° from the arrow coinciding with the a-axis, and in the arrows 61 to 66 illustrated in FIG. 5, the arrows appear every 60° from arrow rotated by 30° from the a-axis. Therefore, a case in which the quotient after dividing the angle of the rotor of the motor 30 by 30 is an even number and the remainder is less than 15 or a case in which the quotient after dividing the angle of the rotor of the motor 30 by 30 is an odd number and the remainder is greater than 15 corresponds to the case in which the angle of the rotor of the motor is closer to the arrows as illustrated in FIG. 4, and other cases corresponding to the case in which the angle of the rotor of the motor is closer to the arrows as illustrated in FIG. 5.

Accordingly, in step S11, the first switch driving mode and the second switch driving mode may be determined based on the quotient and remainder after dividing the angle of the rotor of the motor by 30. In summary, as a result of dividing a value obtained by adding 15° to the angle of the rotor of the motor by 30, if the quotient is the even number, the first switch driving mode may be determined, and if the quotient is the odd number, the second switch driving mode may be determined.

Figure 7:
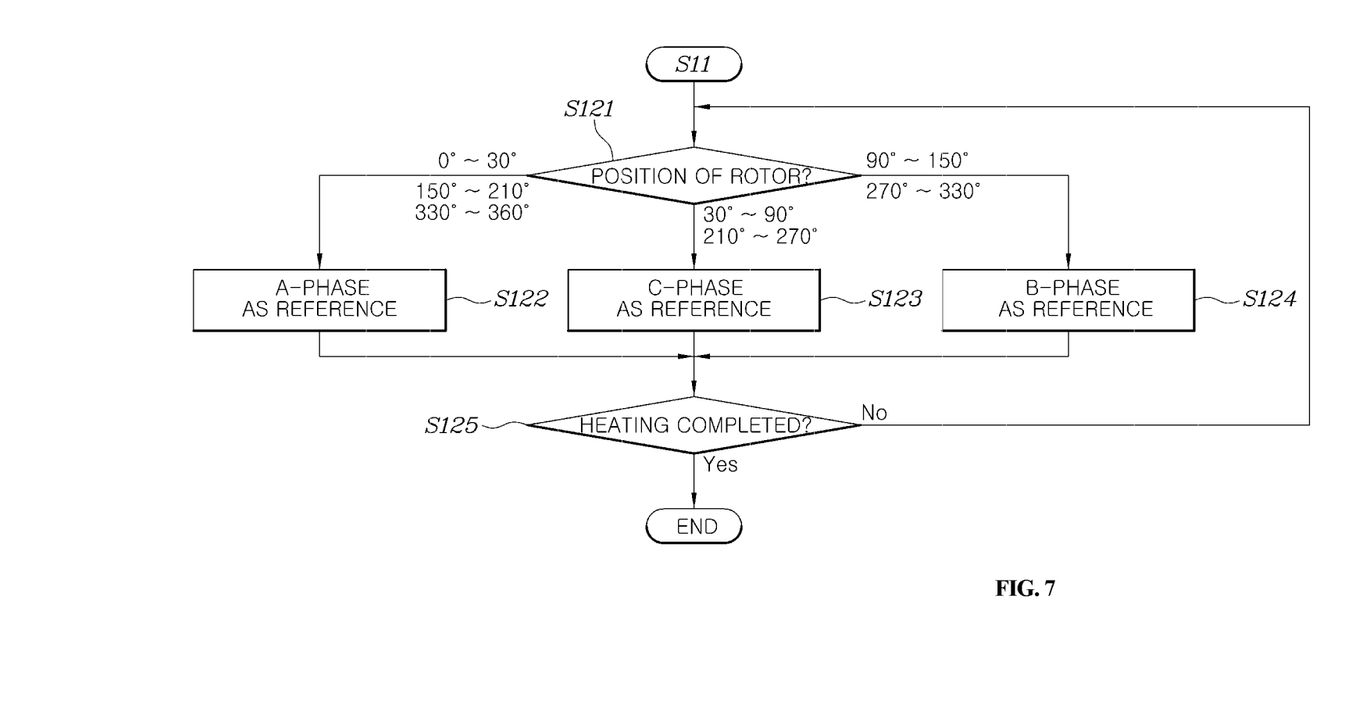
FIG. 7 is a flowchart illustrating in more detail a first switch driving mode in the battery heating method using a motor driving system according to an exemplary embodiment of the present disclosure.
Figure 8:
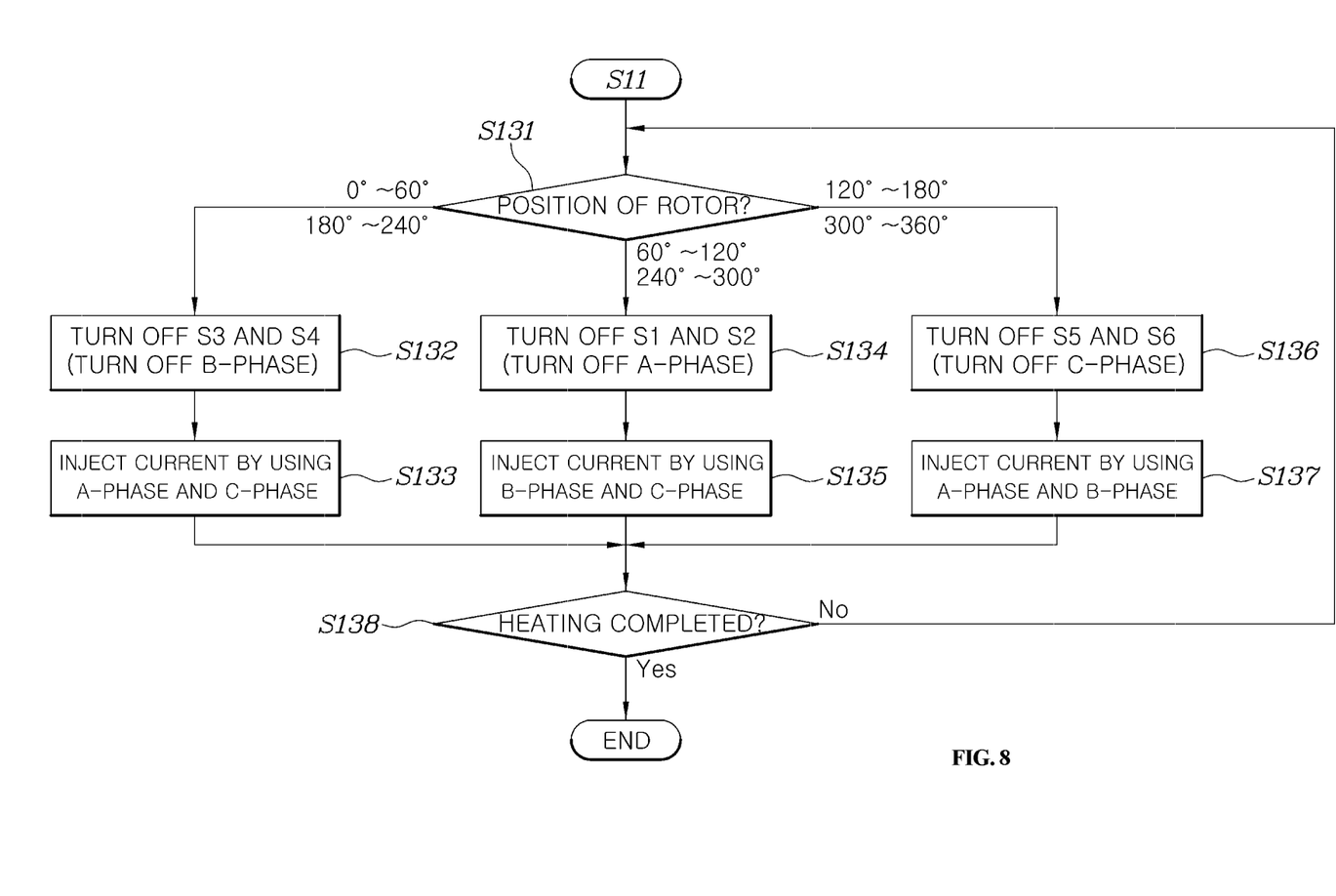
FIG. 8 is a flowchart illustrating in more detail a second switch driving mode in the battery heating method using a motor driving system according to an exemplary embodiment of the present disclosure.

FIG. 7 is a flowchart illustrating in more detail the first switch driving mode in the battery heating method using the motor driving system according to an exemplary embodiment of the present disclosure and FIG. 8 is a flowchart illustrating in more detail the second switch driving mode in the battery heating method using the motor driving system according to an exemplary embodiment of the present disclosure. The methods described herein below may be executed by the controller.

In response to determining to perform the first switch driving mode in step S11, the battery heating method may be configured to include a step S121 of the controller 100 receiving the angle of the motor 30 detected by the rotor position sensor 40 and determining a section to which the angle of the rotor belongs, and steps S122, S123, and S124 of the controller 100 determining a reference phase based on the section to which the angle of the rotor belongs to control the switching elements to be turned on/off with a predetermined switching frequency and injecting the alternating currents to the battery 10, as illustrated in FIG. 7. The above steps may be repeated until a temperature $T_{bat}$ of the battery increases to a predetermined target temperature (S125).

In step S121, when the angle of the rotor is 0° to 30°, 150° to 210°, and 330° to 360°, the controller 100 may be configured to determine the a-phase voltage as a reference (S122). In other words, the alternating current may be generated by operating the switching elements so that on/off states of the switching element S3 of the second leg 23 and the switching element S5 of the third leg 25 are in a complementary relationship with an on/off state of the switching element 51 based on the on/off state of the switching element 51 of the first leg 21 of the inverter 20 in the first section (S122).

In step S121, when the angle of the rotor is 30° to 90° and 210° to 270°, the controller 100 may be configured to determine the c-phase voltage as the reference (S123). In other words, the alternating current may be generated by operating the switching elements so that on/off states of the switching element 51 of the first leg 21 and the switching element S3 of the second leg 23 are in a complementary relationship with an on/off state of the switching element S5 based on the on/off state of the switching element S5 of the third leg 25 of the inverter 20 in the first section (S123).

In step S121, when the angle of the rotor is 90° to 150° and 270° to 330°, the controller 100 may be configured to determine the b-phase voltage as the reference (S124). In other words, the alternating current may be generated by operating the switching elements so that on/off states of the switching element 51 of the first 21 and the switching element S5 of the third leg 25 are in a complementary relationship with an on/off state of the switching element S3 based on the on/off state of the switching element S3 of the second leg 23 of the inverter 20 in the first section (S124).

Meanwhile, in response to determining to perform the second switch driving mode in step S11, the battery heating method may be configured to include a step S131 of the controller 100 receiving the angle of the motor 30 detected by the rotor position sensor 40 and determining a section to which the angle of the rotor belongs, steps S132, S134, and S136 of the controller 100 determining legs for maintaining the off state based on the section to which the angle of the rotor belongs, and steps S133, S135, and S137 of the controller 100 controlling the on/off states of the switching elements included in the leg other than the legs for maintaining the off state in the first section to generate the alternating currents. The above steps may be repeated until the temperature $T_{bat}$ of the battery increases to a predetermined target temperature (S138).

In step S131, when the angle of the rotor is 0° to 60° and 180° to 240°, the controller 100 may be configured to turn off the switching elements S3 and S4 included the b-phase leg 23 (S132) and generate the alternating current by controlling the on/off states of the switching elements 51, S2, S5, and S6 included in the c-phase leg 25 and the a-phase leg 21 in the first section (S133). In step S133, in the first section, the controller 100 may be configured to perform control so that the states of the pair of switching elements S5 and S6 included in the c-phase leg 25 are in the complementary relationship, and perform control so that the states of the pair of switching elements 51 and S2 included in the a-phase leg 21 are in the complementary relationship. In addition, the controller 100 may be configured to generate the alternating current injected into the battery 10 by performing control so that the states of the switching element S5 connected to the positive (+) terminal of the battery 10 among the switching elements included in the c-phase leg 25 and the switching element 51 connected to the positive terminal of the battery 10 among the switching elements included in the a-phase leg 21 are in the mutually complementary relationship in the first section.

In step S131, when the angle of the rotor is 60° to 120° and 240° to 300°, the controller 100 may be configured to turn off the switching elements 51 and S2 included the a-phase leg 21 in the first section (S134) and generate the alternating current by controlling the on/off states of the switching elements S3, S4, S5, and S6 included in the b-phase leg 23 and the c-phase leg 25 (S135). In step S135, in the first section, the controller 100 may be configured to perform control so that the states of the pair of switching elements S3 and S4 included in the b-phase leg 23 are in the complementary relationship, and perform control so that the states of the pair of switching elements S5 and S6 included in the c-phase leg 25 are in the complementary relationship. In addition, the controller 100 may be configured to generate the alternating current injected into the battery 10 by performing control so that the states of the switching element S3 connected to the positive (+) terminal of the battery 10 among the switching elements included in the b-phase leg 23 and the switching element S5 connected to the positive terminal of the battery 10 among the switching elements included in the c-phase leg 25 are in the mutually complementary relationship in the first section.

In step S131, when the angle of the rotor is 120° to 180° and 300° to 360°, the controller 100 may be configured to turn off the switching elements S5 and S6 included the c-phase leg 25 in the first section (S136) and generate the alternating current by alternatively controlling the on/off states of the switching elements S1, S2, S3, and S4 included in the a-phase leg 21 and the b-phase leg 23 with a predetermined switching frequency (S137). In step S137, in the first section, the controller 100 may be configured to perform control so that the states of the pair of switching elements 51 and S2 included in the a-phase leg 21 are in the complementary relationship, and perform control so that the states of the pair of switching elements S3 and S4 included in the b-phase leg 23 are in the complementary relationship. In addition, the controller 100 may be configured to generate the alternating current injected into the battery 10 by performing control so that the states of the switching element 51 connected to the positive (+) terminal of the battery 10 among the switching elements included in the a-phase leg 21 and the switching element S3 connected to the positive terminal of the battery 10 among the switching elements included in the b-phase leg 23 are in the mutually complementary relationship in the first section.

As described above, the battery heating system and method using the motor driving system according to various exemplary embodiments of the present disclosure may efficiently heat the battery without additional cost increase by injecting the alternating current to the battery using the inverter and the motor that are connected to the battery provided to drive the eco-friendly vehicle, without a separate heating apparatus. In particular, when generating the alternating current using the inverter and the motor, the torque pulsation generated in the motor may be maximally suppressed, thereby improving the stability of the vehicle. In addition, the motor driving system according to various exemplary embodiments of the present disclosure may further reduce switching loss by switching the switching elements in the state in which the motor current is zero when operating the switching elements for battery heating.

According to the battery heating system and method using the motor driving system, it may be possible to efficiently increase the temperature of the battery without additional cost increase by injecting the alternating current to the battery using the inverter and the motor that are essential for driving the eco-friendly vehicle, without adding the heating apparatus such as the separate heater or the like.

In particular, according to the battery heating system and method using the motor driving system, when generating the AC using the inverter and the motor, the torque pulsation generated in the motor may be suppressed as much as possible, thereby improving the stability of the vehicle. In particular, according to the battery heating system and method using the motor driving system, the switching loss in the inverter may be further reduced by switching the switching element in the inverter in the state in which the motor current is zero.

The effects obtainable in the present disclosure are not limited to the effects mentioned above, and other effects that are not mentioned may be obviously understood by those skilled in the art to which the present disclosure pertains from the following description.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims.

What is claimed is:

1. A battery heating system using a motor driving system, comprising:
 an inverter having a plurality of legs that each include a pair of switching elements connected in series to each other between both ends of a battery and correspond to each of a plurality of phases;

a motor having a plurality of coils each having a first end connected to a connection terminal between the pair of switching elements included in the plurality of legs, and second ends of each of the plurality of coils being connected to each other; and a controller configured to drive the switching elements so that a first section in which at least some of the switching elements are turned on and a second section in which all of the switching elements are turned off are alternately repeated, wherein the controller is further configured to:

drive the switching elements in a first switch driving mode in which the switching elements are driven so that on/off states of the switching elements included one leg corresponding to one reference phase of the plurality of phases and the switching elements included in remaining legs are in a mutually complementary relationship, or drive the switching elements in a second switch driving mode in which the switching elements are driven so that the on/off states of the switching elements included in the legs corresponding to two phases of the plurality of phases are in the mutually complementary relationship and drives the switching elements included in the remaining leg to be in the off state, in the first section.

2. The battery heating system of claim 1, wherein the controller is configured to:

perform control so that the on/off states of the pair of switching elements included in the plurality of legs are in the mutually complementary relationship in the first section when applying the first switch driving mode; and perform control so that on/off states of a switching element connected to a positive terminal of the battery among the switching elements included in the leg corresponding to the reference phase and a switching element connected to the positive terminal of the battery among the switching elements included in the remaining legs are in the mutually complementary relationship.

3. The battery heating system of claim 1, wherein the controller is configured to:

performs control so that states of a pair of switching elements included in a first leg corresponding to one phase of two selected phases are in the mutually complementary relationship according to a switching frequency and performs control so that states of a pair of switching elements included in a second leg corresponding to the other phase of the two selected phases are in the mutually complementary relationship according to the switching frequency, in the first section, when applying the second switch driving mode; and performs control so that states of a switching element connected to a positive terminal of the battery among the switching elements in the first leg and a switching element connected to the positive terminal of the battery among the switching elements in the second leg are in the mutually complementary relationship.

4. The battery heating system of claim 1, wherein the controller is configured to determine the reference phase applied in the first switch driving mode or the two phases in which the switching elements are driven in the second switch driving mode, based on an angle of a rotor of the motor.

5. The battery heating system of claim 4, wherein the controller is configured to determine the reference phase of the first switch driving mode or the two phases in which the switching elements are driven in the second switch driving mode to minimize a difference between the angle of the rotor and an angle indicated by a current provided to the motor on a dq stationary coordinate plane.

6. A battery heating system using a motor driving system, comprising:

an inverter having an a-phase leg, a b-phase leg, and a c-phase leg each including a pair of switching elements connected in series between both ends of a battery;

a motor including an a-phase coil having a first end connected to a connection node between the pair of switching elements included in the a-phase leg, a b-phase coil having a first end connected to a connection node between the pair of switching elements included in the b-phase leg, and a c-phase coil having a first end connected to a connection node between the pair of switching elements included in the c-phase leg, a second end of the a-phase coil, a second end of the b-phase coil, and a second end of the c-phase coil being connected to each other; and a controller configured to drive the switching elements so that a first section in which at least some of the switching elements are turned on and a second section in which all of the switching elements are turned off are alternately repeated, wherein the controller is configured to:

drive the switching elements in a first switch driving mode in which the switching elements are driven so that on/off states of the switching elements included a leg corresponding to one reference phase of an a-phase, a b-phase, and a c-phase and on/off states of the switching elements included in the legs corresponding to the remaining phases are in a mutually complementary relationship, or drive the switching elements in a second switch driving mode in which the switching elements are driven so that the on/off states of the switching elements included in the legs corresponding to two phases of the a-phase, the b-phase, and the c-phase are in the mutually complementary relationship and drives the switching elements included in the remaining leg to be in the off state, in the first section.

7. The battery heating system of claim 6, wherein the controller is configured to:

perform control so that the on/off states of the pair of switching elements included in a plurality of legs are in the mutually complementary relationship in the first section when using a first driving technique, and perform control so that on/off states of a switching element connected to a positive terminal of the battery among the switching elements included in the leg corresponding to the reference phase and a switching element connected to the positive terminal of the battery among the switching elements included in remaining legs are in the mutually complementary relationship.

8. The battery heating system of claim 6, wherein the controller is configured to:

perform control so that states of a pair of switching elements included in a first leg corresponding to one phase of two selected phases are in the mutually complementary relationship according to a switching frequency and perform control so that states of a pair of switching elements included in a second leg corresponding to the other phase of the two selected phases are in the mutually complementary relationship according to the switching frequency, in the first section, when applying a second driving technique, and perform control so that states of a switching element connected to a positive terminal of the battery among the switching elements in the first leg and a switching element connected to the positive terminal of the battery among the switching elements in the second leg are in the mutually complementary relationship.

9. The battery heating system of claim 6, wherein the controller is configured to determine the reference phase applied in the first switch driving mode or the two phases in which the switching elements are driven in the second switch driving mode, based on an angle of a rotor of the motor.

10. The battery heating system of claim 9, wherein the controller is configured to determine the reference phase of the first switch driving mode or the two phases in which the switching elements are driven in the second switch driving mode to minimize a difference between the angle of the rotor and an angle indicated by a current provided to the motor on a dq stationary coordinate plane.

11. The battery heating system of claim 9, wherein the controller is configured to drive the switching elements in the first switch driving mode when a remainder of dividing a value obtained by adding 15° to the angle of the rotor by 30° is an even number, and drive the switching elements in the second switch driving mode when the remainder of dividing a value obtained by adding 15° to the angle of the rotor by 30° is an odd number.

12. The battery heating system of claim 9, wherein the controller is configured to drive the switching elements by determining the a-phase as a reference phase when the angle of the rotor is 0° to 30°, 150° to 210°, and 330° to 360°, in the first switch driving mode.

13. The battery heating system of claim 9, wherein the controller is configured to drive the switching elements by determining the c-phase as a reference phase when the angle of the rotor is 30° to 90° and 210° to 270°, in the first switch driving mode.

14. The battery heating system of claim 9, wherein the controller is configured to drive the switching elements by determining the b-phase as a reference phase when the angle of the rotor is 90° to 150° and 270° to 330°, in the first switch driving mode.

15. The battery heating system of claim 9, wherein in the second switch driving mode, the controller is configured to select the c-phase leg and the a-phase leg when the angle of the rotor is 0° to 60° and 180° to 240°, drive the on-off states of the switching elements included in the c-phase leg and the a-phase leg in the mutually complementary relationship in the first section, and turn off the switching elements included in the b-phase leg.

16. The battery heating system of claim 9, wherein in the second switch driving mode, the controller is configured to select the b-phase leg and the c-phase leg when the angle of the rotor is 60° to 120° and 240° to 300°, drive the on-off states of the switching elements included in the b-phase leg and the c-phase leg in the mutually complementary relationship in the first section, and turn off the switching elements included in the a-phase leg.

17. The battery heating system of claim 9, wherein in the second switch driving mode, the controller is configured to select the a-phase leg and the b-phase leg when the angle of the rotor is 120° to 180° and 300° to 360°, drive the on-off states of the switching elements included in the a-phase leg and the b-phase leg in the mutually complementary relationship in the first section, and turn off the switching elements included in the c-phase leg.

18. A battery heating method using the battery heating system of claim 6, comprising:
   determining, by the controller, a section of an angle of a rotor of the motor;
   selecting, by the controller, one of the first switch driving mode and the second switch driving mode based on the section;
   driving, by the controller, the switching elements so that on/off states of the switching elements included in a leg corresponding to the reference phase and on/off states of the switching elements included in the legs corresponding to the remaining phases are in the mutually complementary relationship in the first section, when the first switch driving mode is selected; and
   driving, by the controller, the switching elements so that on/off states of the switching elements included in the legs corresponding to two phases are in the mutually complementary relationship in the first section and driving, by the controller, the switching elements so that the switching elements included in the remaining leg are in the off state, when the second switch driving mode is selected.

19. The battery heating method of claim 18, wherein the selecting of one of the first switch driving mode and the second switch driving mode, includes driving the switching elements in the first switch driving mode when a remainder of dividing a value obtained by adding 15° to the angle of the rotor by 30° is an even number, and driving the switching elements in the second switch driving mode when the remainder of dividing a value obtained by adding 15° to the angle of the rotor by 30° is an odd number.

20. The battery heating method of claim 18, wherein the driving of the switching elements, includes when the first switch driving mode is selected, driving the switching elements by determining the a-phase as a reference phase when the angle of the rotor is 0° to 30°, 150° to 210°, and 330° to 360°.

21. The battery heating method of claim 18, wherein the driving of the switching elements, includes when the first switch driving mode is selected, driving the switching elements by determining the c-phase as a reference phase when the angle of the rotor is 30° to 90° and 210° to 270°.

22. The battery heating method of claim 18, wherein the driving of the switching elements, includes when the first switch driving mode is selected, driving the switching elements by determining the b-phase as a reference phase when the angle of the rotor is 90° to 150° and 270° to 330°.

23. The battery heating method of claim 18, wherein the driving of the switching elements, includes when the second switch driving mode is selected, selecting the c-phase leg and the a-phase leg when the angle of the rotor is 0° to 60° and 180° to 240°, driving the on-off states of the switching elements included in the c-phase leg and the a-phase leg in the mutually complementary relationship in the first section, and turning off the switching elements included in the b-phase leg.

24. The battery heating method of claim 18, wherein the driving of the switching elements, includes when the second switch driving mode is selected, selecting the b-phase leg and the c-phase leg when the angle of the rotor is 60° to 120° and 240° to 300°, driving the on-off states of the switching elements included in the b-phase leg and the c-phase leg in the mutually complementary relationship in the first section, and turning off the switching elements included in the a-phase leg.

25. The battery heating method of claim 18, wherein the driving of the switching elements, includes when the second switch driving mode is selected, selecting the a-phase leg and the b-phase leg when the angle of the rotor is 120° to 180° and 300° to 360°, driving the on-off states of the switching elements included in the a-phase leg and the b-phase leg in the mutually complementary relationship in the first section, and turning off the switching elements included in the c-phase leg.

\* \* \* \* \*